(12) United States Patent
Hashimoto

(10) Patent No.: US 8,014,998 B2
(45) Date of Patent: Sep. 6, 2011

(54) ELECTRONIC DEVICE

(75) Inventor: Yasunari Hashimoto, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 1179 days.

(21) Appl. No.: 11/723,013

(22) Filed: Mar. 15, 2007

(65) Prior Publication Data

US 2007/0226284 A1  Sep. 27, 2007

(30) Foreign Application Priority Data

Mar. 24, 2006 (JP) .................................. 2006-084026

(51) Int. Cl.
*G10L 17/20* (2006.01)

(52) U.S. Cl. .................... 704/8; 704/7; 704/9; 704/10

(58) Field of Classification Search .................... None
See application file for complete search history.

(56) References Cited

U.S. PATENT DOCUMENTS

| | | | | |
|---|---|---|---|---|
| 5,983,182 A | * | 11/1999 | Moore | 704/270 |
| 6,128,434 A | * | 10/2000 | Hirayama et al. | 386/97 |
| 6,384,922 B1 | * | 5/2002 | Hayama et al. | 358/1.13 |
| 6,879,349 B2 | * | 4/2005 | Nishida et al. | 348/553 |
| 6,940,563 B2 | * | 9/2005 | Ishihara | 348/738 |
| 7,185,289 B1 | * | 2/2007 | Taima | 715/810 |
| 7,320,110 B2 | * | 1/2008 | Shah | 715/764 |
| 7,356,459 B2 | * | 4/2008 | Bergemann et al. | 704/8 |
| 7,475,233 B2 | * | 1/2009 | Rothman et al. | 713/1 |
| 2004/0049234 A1 | * | 3/2004 | Morgan et al. | 607/5 |

FOREIGN PATENT DOCUMENTS

| | | |
|---|---|---|
| JP | 2002-328671 | 11/2002 |
| JP | 2004-112341 | 4/2004 |
| JP | 2005-197923 | 7/2005 |
| JP | 2005-202105 | 7/2005 |

* cited by examiner

*Primary Examiner* — Leonard Saint Cyr
(74) *Attorney, Agent, or Firm* — Harness, Dickey & Pierce, PLC

(57) ABSTRACT

A storing unit stores therein a plurality of different display language data that is switchable according to a use environment of a user. A selecting unit selects a display language data from the storing unit in response to display language specification information supplied from a main unit at a time of starting the electronic device. A displaying unit displays an operation screen with selected display language data. When there is no display language specification information from the main unit, the selecting unit selects a predetermined display language data according to a difference between stored display language data and display language data set in a factory setting.

6 Claims, 7 Drawing Sheets

ELECTRONIC DEVICE

CROSS-REFERENCE TO RELATED APPLICATIONS

The present document incorporates by reference the entire contents of Japanese priority document, 2006-084026 filed in Japan on Mar. 24, 2006.

BACKGROUND OF THE INVENTION

1. Field of the Invention

The present invention relates to a technology for selecting and displaying a language according to a use environment of a user in an electronic device including an operating unit capable of selectively displaying a plurality of different languages.

2. Description of the Related Art

In recent years, with sales areas being diversified, an operating unit of an electronic device, such as a copier, facsimile, or printer, not only supports a plurality of languages as a display language, but also, for example, includes a plurality of pieces of different language data in one device and can switch among these pieces of language data at a later time in order to provide a display language according to a use environment of a user. In this manner, such an operating unit is configured to support various use environments.

In such a device, to share the control load among a plurality of Central Processing Units (CPUs), the operating unit includes a dedicated CPU independently of the main unit, and various pieces data are read from the memory provided for each CPU for start control. However, if all memories for CPUs are nonvolatile memories that can retain data even after power shutdown, the cost is high. To get around this problem, a nonvolatile memory is provided for a CPU of the control unit of the main unit, and at the time of activation at power-on, various pieces of data retained in that nonvolatile memory are transferred to the operating unit (refer to Japanese Patent Application Laid-Open No. 2005-202105).

In one possible configuration of such a device, different pieces of display language data that can be switched according to the use environment of the user are provided in the operating unit, and a specification for the operating unit to select a language to be displayed is supplied from the main unit at the time of activating.

In this configuration, however, if an abnormality occurs to the main unit, the operating unit cannot receive any specifying information, thereby falling into a state in which it cannot be determined which language to be used for display. For example, if an abnormality occurs to the main unit while the user is installing a use language later on, the user may not be able to recognize an error message displayed on the operating unit.

SUMMARY OF THE INVENTION

It is an object of the present invention to at least partially solve the problems in the conventional technology.

An electronic device according to one aspect of the present invention includes an operating unit including a storing unit that stores therein a plurality of different display language data that is switchable according to a use environment of a user, a selecting unit that selects a display language data from the storing unit in response to display language specification information supplied from a main unit of the electronic device at a time of starting the electronic device, and a displaying unit that displays an operation screen with the display language data selected by the selecting unit. When the display language specification information is not supplied from the main unit, the selecting unit selects a predetermined display language data according to a difference between the display language data stored in the storing unit and display language data set in a factory setting.

An electronic device according to another aspect of the present invention includes an operating unit including a first storing unit that stores therein a plurality of different display language data that is switchable according to a use environment of a user, a selecting unit that selects a display language data from the first storing unit in response to display language specification information supplied from a main unit of the electronic device at a time of starting the electronic device, a displaying unit that displays an operation screen with the display language data selected by the selecting unit, and a second storing unit that stores therein selected language information indicating the display language data selected by the selecting unit. When the display language specification information is not supplied from the main unit, the selecting unit selects display language data corresponding to the selected language information from the first storing unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
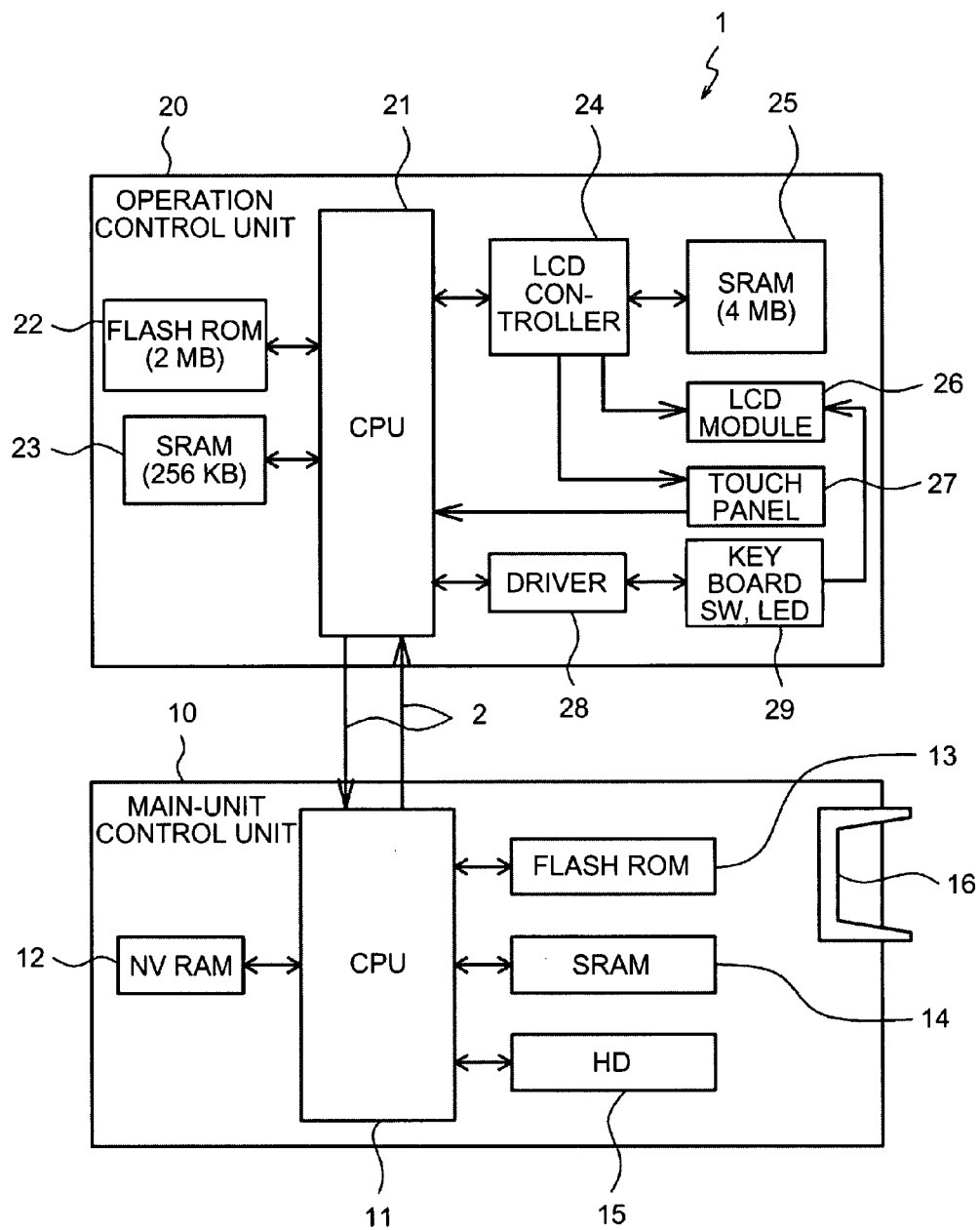
FIG. 1 is a schematic diagram of a control unit of a main unit of an image forming apparatus according to an embodiment of the present invention and a control unit of an operating unit of the image forming apparatus.

FIG. 1 is a schematic diagram of a control unit of a main unit (hereinafter, "main-unit control unit") of an image forming apparatus according to an embodiment of the present invention and a control unit of an operating unit (hereinafter, "operation control unit") of the image forming apparatus. As shown in FIG. 1, an image forming apparatus 1 includes a main-unit control unit 10 and an operation control unit 20 having a copy function, a facsimile function, a printer function, a scanner function, and other various functions.

The main-unit control unit 10 includes a central processing unit (CPU) 11, a nonvolatile random access memory (NVRAM) 12, a flash read only memory (ROM) 13, a static RAM (SRAM) 14, a hard disk (HD) 15, and a card slot 16. The operation control unit 20 includes a CPU 21, a flash ROM (nonvolatile memory) 22, an SRAM 23, a liquid crystal display (LCD) controller 24, a synchronous dynamic RAM (SDRAM) 25, and an LCD module 26, a touch panel 27, a driver 28, and a key board 29. The CPU 11 of the main-unit control unit 10 and the CPU 21 of the operation control unit 20 are connected together via a synchronous serial communication line 2, allowing bidirectional data communication for rendering commands, input information, and others.

The flash ROM 22 of the operation control unit 20 has stored therein, for example, a control program, such as a display program, and image data. The SRAM 23 is used as a work area for the CPU 21. Details about storage information of the flash ROM 22 will be explained further below by using FIG. 3.

The LCD controller 24 causes the LCD module 26 to display various kinds of information. The touch panel 27 is placed so as to be overlaid on the LCD module 26 and, when a position corresponding to an operation key displayed on the LCD module 26 is touched for operation, the touch operation is output to the CPU 21. The CPU 21 then recognizes the touch operation from the touch panel 27 to perform a process corresponding to the operation information.

The key board 29 has been provided with various switches (SW) and a light emitting diode (LED), to which the driver 28 is connected. The CPU 21 drives these various switches and LED via driver 28, and performs backlight control of the LCD module 26.

The LCD controller 24 has connected thereto the SDRAM 25 having stored therein display pixel data for display on the LCD module 26. The CPU 21 reads and writes the display pixel data from and to the SDRAM 25 via the LCD controller 24.

Furthermore, the LCD controller 24 refreshes the SDRAM 25 and transfers display data (outputs a display signal) from the SDRAM 25 to the LCD module 26. With settings in an internal register (not shown), such an output of a display signal to the LCD module 26 can be controlled.

The NVRAM 12 of the main-unit control unit 10 is a nonvolatile memory capable of retaining data even if the image forming apparatus is powered off. Also, the flash ROM (nonvolatile memory) 13 has stored therein, for example, a control program for the image forming apparatus 1 and system data. The SRAM 14 is used as a work memory for the CPU 11. The HD 15 has read image data stored therein, for example.

To the card slot 16, an external storage medium having a program and data, for example, an IC card, is inserted in a removable manner. The CPU 11 reads the program and data from the external storage medium inserted in the card slot 16 or writes a program and data to that external storage medium. The main-unit control unit 10 can confirm at its input port whether an SD card is inserted in the card slot 16. Here, instead of such a card slot, another structure may be used as long as it allows a program and data to be read therefrom.

Figure 2:
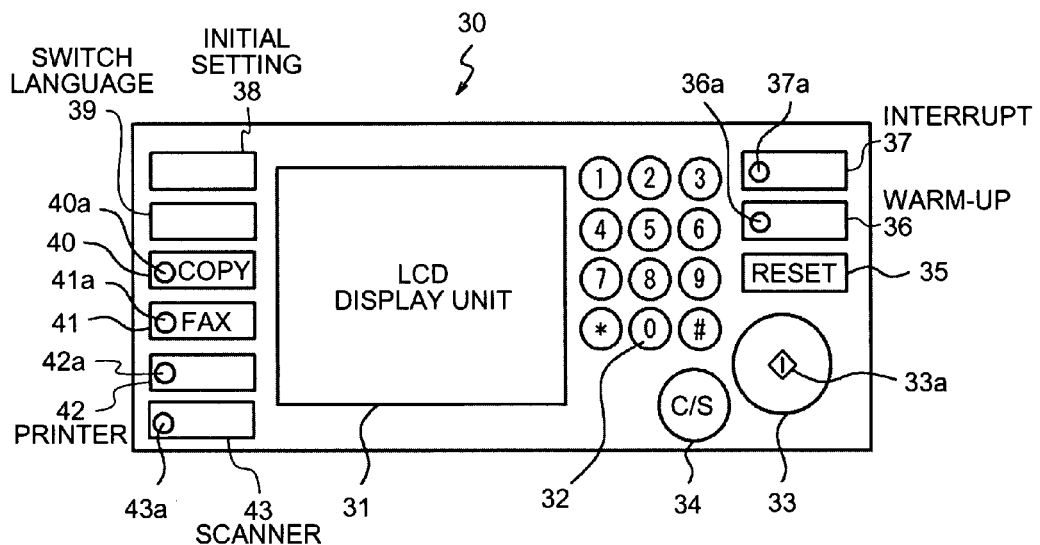
FIG. 2 is a plan view of an operating unit incorporated in the image forming apparatus according to the embodiment of the present invention.

FIG. 2 is a plan view of the operating unit incorporated in the image forming apparatus 1. This operating unit 30 is provided with an LCD display unit 31 of the LCD module 26, a numeric keypad 32 for inputting the number of prints and a copy scaling, a start key 33 for instruction for start of a printing operation, a clear/stop key 34 for instruction for suspending the printing operation or clearing the numeric keypad input result, a reset key 35 for returning the set print mode to a default state, a warm-up key 36 for instruction for transition/cancel of a warm-up state, an interrupt mode key 37 for interrupting an ongoing print operation for another print operation, an initial setting mode key 38 for setting the image forming apparatus 1 according to usability of an administrator or user of the image forming apparatus 1, a language switch key 39 for switching a display language on the LCD module 26 to another language, and hard keys, such as application switch-keys 40 to 43 for selecting any one of copy, facsimile, printer, and scanner, for example. The start key 33, the warm-up key 36, the interrupt mode key 37, and the application switch keys 40 to 43 are provided with LEDs 33a, 36a, 37a, and 40a to 43a, respectively, each for indicating a key selection state. In particular, the LED 33a on the start key 33 is lit green when the image forming apparatus 1 can perform a print operation, and is lit red when the image forming apparatus cannot perform a print operation.

Figure 3:
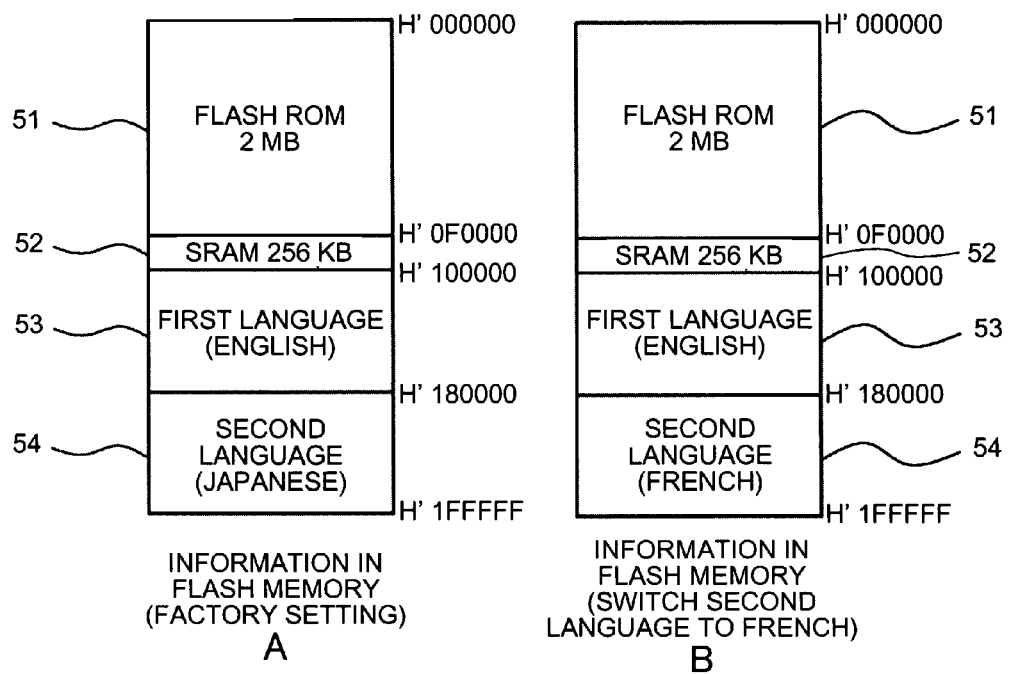
FIG. 3 is a schematic diagram for explaining stored information of a flash ROM of the operation control unit in the image forming apparatus according to the embodiment of the present invention.

FIG. 3 is a schematic diagram for explaining stored information of the flash ROM 22 of the operation control unit 20. In FIG. 3, "A" denotes stored information at the time of shipment, where a control program storage area 51 (addresses 0 to 0F0000H) has stored therein control programs, a selected-language-information storage area 52 (0F0000 to 100000H) has stored therein selected language information, a first-language-data storage area 53 (100000 to 17FFFFH) has stored therein English data as first language data, a second-language-data storage area 54 (180000 to 1FFFFFH) has stored therein Japanese data as a second language data. Also, "B" shown in FIG. 3 denotes a state where the second language data is switched from Japanese to French according to a user's use environment. Such switching can be performed by inserting an SD card having stored therein language data in the card slot 16 of the main-unit control unit 10 to feed the language data desired by the user to the operation control unit 20 through the synchronous serial communication line 2 and then the language data is stored in the flash ROM 22 by the operation control unit 20. Also, the selected language information is the one that corresponds to the language read from the flash ROM 13 of the main-unit control unit 10 as a language for display on the LCD module 26 from out of the first language data and the second language data and specified by display language specifying information supplied via the synchronous serial communication line 2 to the operation control unit 20.

A procedure until the CPU 21 of the operation control unit 20 determines a display language for display on the LCD module 26 at the time of activating the image forming apparatus 1 configured as explained above is explained by using a flowchart of FIG. 4.

In the operation control unit 20, a program on the flash ROM 22 is started (step S1). After initialization of the SRAM 23 and the SDRAM 25 (step S2) and initialization of devices, such as the LCD controller 24, the LEDs, the touch panel 27, and various hard keys (step S3), the synchronous serial communication line 2 is opened (step S4) to wait for display language specifying information to be transmitted from the main-unit control unit 10 (step S5).

Upon reception of the display language-specifying signal from the main-unit control unit 10 ("Yes" at step S5), the display language is determined according to that specification (step S6). If a display language-specifying signal cannot be obtained from the main-unit control unit 10 within a defined time ("Yes" at step S10), it is determined that an abnormality has occurred to the main-unit control unit 10. Then the current language data stored in the flash ROM 22 and the language data at the time of shipment are compared to check whether language data switched according to the use environment of the user is present (steps S11 and S12).

The operation control unit 20 has stored therein the on-board language data at the time of shipment at a program level. By comparing this on-board language data with language data actually on board at the time of activation, it can be determined whether the language data has been switched. If such switching is present ("Yes" at step S12), the language after switching is selected as a display language (step S13). If no such switching is present ("No" at step S12), English regarded as an international standard language is selected as a display language (step S14).

The LCD controller 24 reads thus selected display language data from the flash ROM 22, writes the data in the SDRAM 25 for read, thereby causing the LCD module 26 to display an operation screen with the selected language. Here, it is assumed that an abnormality has occurred to the main-unit control unit 10 and a display language is selected through step S13 or S14, a message indicating that an abnormality has occurred is displayed.

With such a configuration, even if an abnormality has occurred to the main-unit control unit 10 and no display language specifying information is transmitted, a difference between the current display language data and the display language data at the time of shipment is used to select display language data suitable for the use environment of the user, thereby making it possible to inform the user that an abnormality has occurred to the main unit. Also, even if the switching of the display language data according to the use environment is not performed, English as an international standard language is selected as a display language, thereby increasing the possibility that the user can recognize the display language. With this, it is possible to achieve a control configuration in which the main-unit control unit 10 and the operation control unit 20 are separated from each other, thereby increasing usability.

Figure 4:
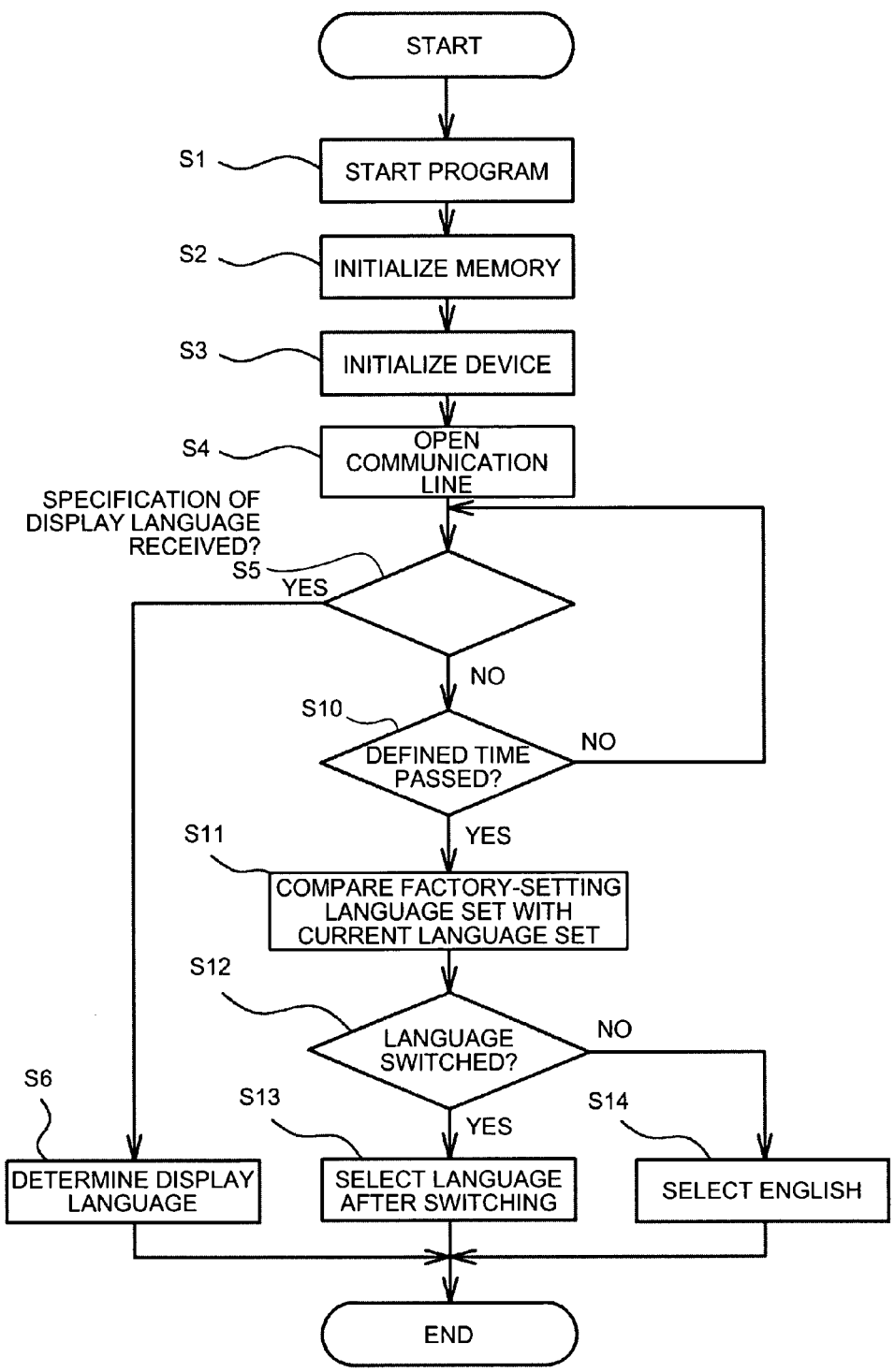
FIG. 4 is a flowchart of a procedure until the operation control unit determines a display language at the time of activating the image forming apparatus according to the embodiment of the present invention.
Figure 5:
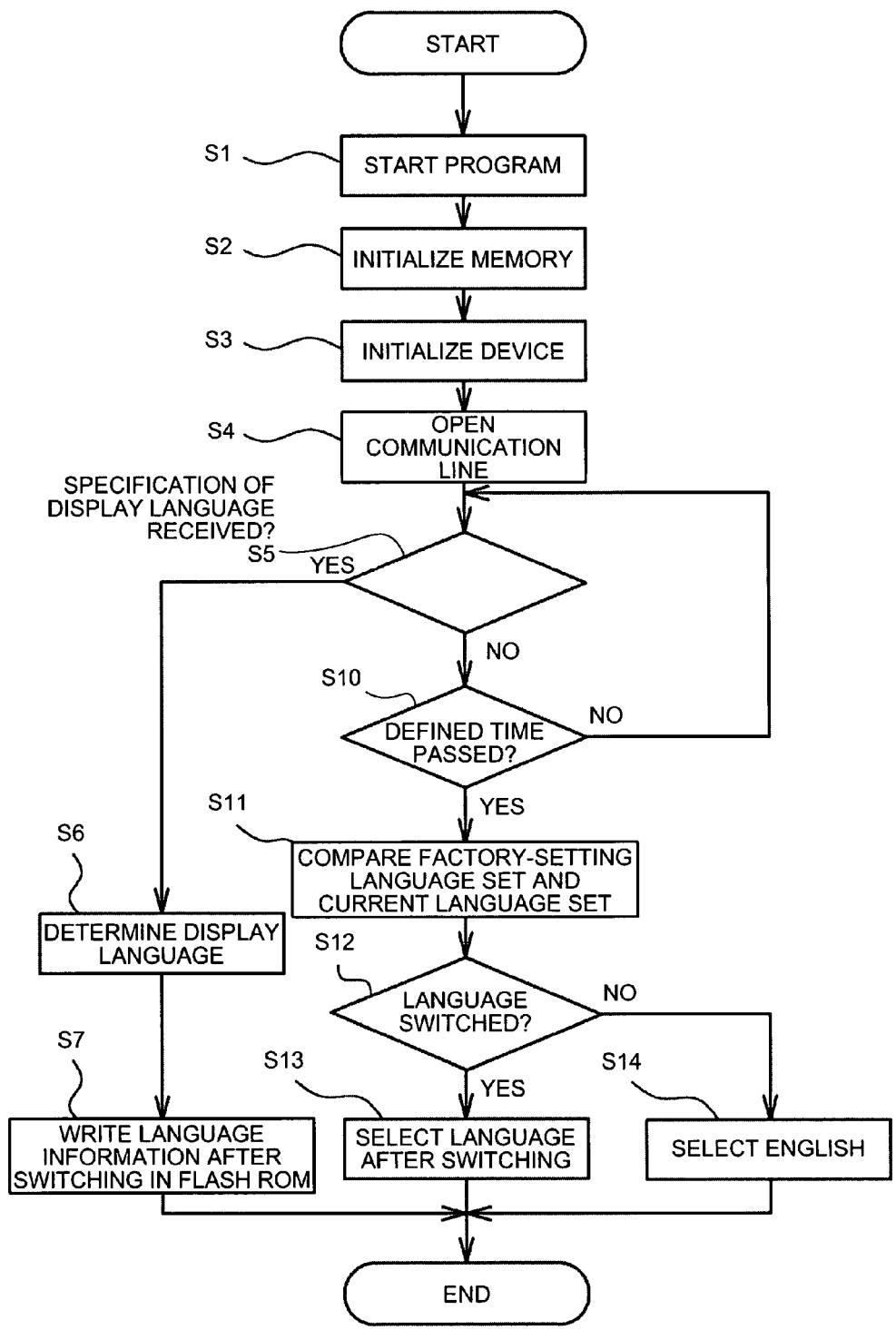
FIG. 5 is a flowchart of a procedure until the operation control unit determines and stores a display language at the time of activating the image forming apparatus according to the embodiment of the present invention.

A procedure is explained with reference to a flowchart of FIG. 5, in which the CPU 21 of the operation control unit 20 determines a display language for display on the LCD module 26 at the time of activating the image forming apparatus 1 for storage in the selected-language-information storage area 52 of the flash ROM 22. In FIG. 5, steps identical to those in FIG. 4 are provided with the same reference numerals used in FIG. 4. As shown in FIG. 5, after the display language is determined according to a specifying signal from the main-unit control unit 10 through the same procedure (step S6), information indicating of that display language is written in the selected-language-information storage area 52 of the flash ROM 22 (step S7).

Figure 6:
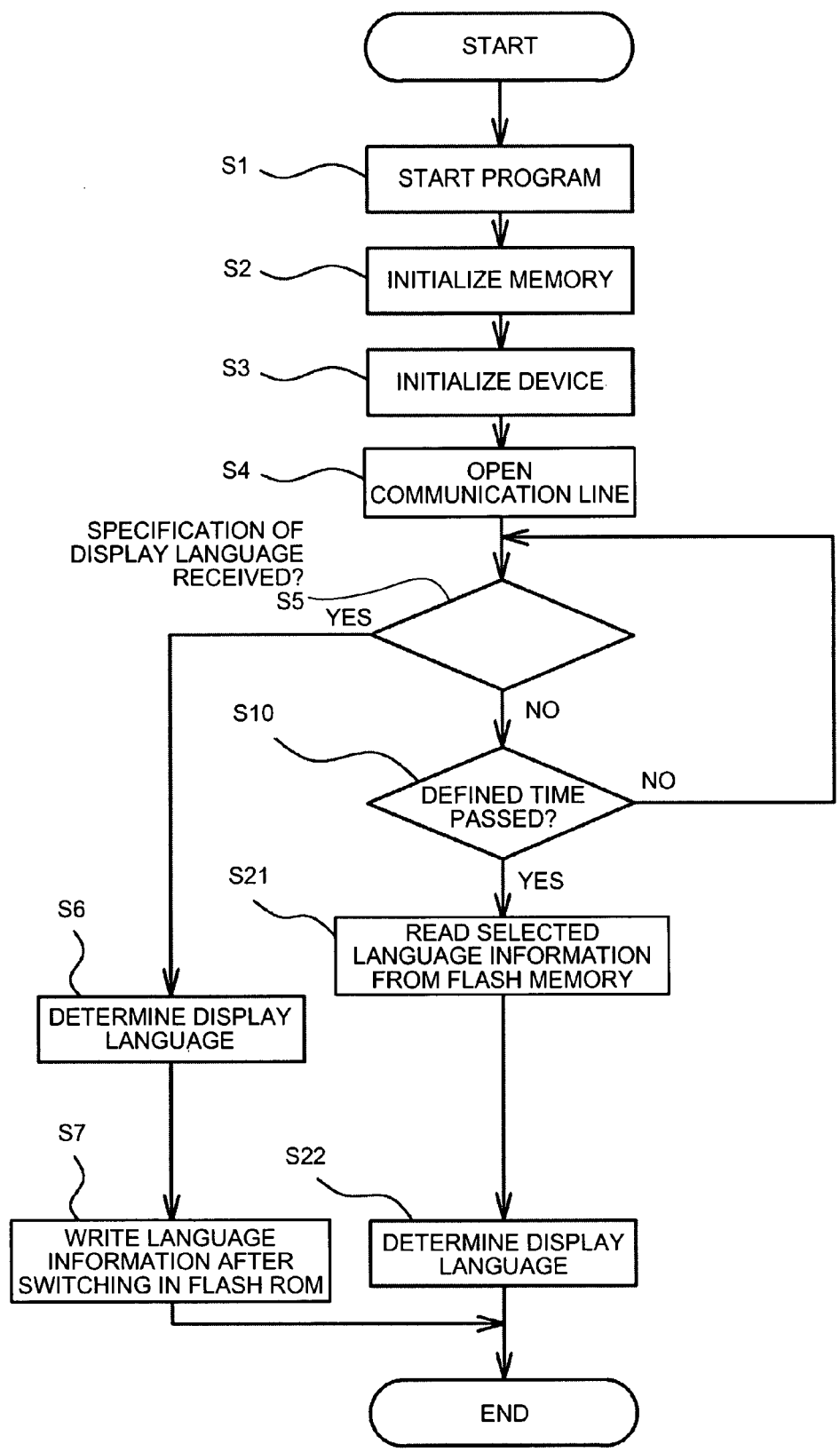
FIG. 6 is a flowchart of another procedure until the operation control unit determines and stores a display language at the time of activating the image forming apparatus according to the embodiment of the present invention.

FIG. 6 is a flowchart of a procedure in which the CPU 21 of the operation control unit 20 determines a display language for display on the LCD module 26 through a procedure different from that of FIG. 5 at the time of activating the image forming apparatus 1 for storage in the flash ROM 22. In FIG. 6, steps identical to those in FIG. 5 are provided with the same reference numerals used in FIG. 5.

In this procedure, if a specifying signal from the main-unit control unit 10 has not been able to be obtained within a defined time ("Yes" at step S10), it is determined that an abnormality has occurred to the main-unit control unit 10. Then, the selected language information retained in the selected-language-information storage area 52 of the flash ROM 22, in other word, the selected language information written in the selected-language-information storage area 52 at the time of previous activation, is read (step S21), and a language indicated by the selected language information is then determined as the display language (step S22).

With such a process, even if an abnormality has occurred to the main-unit control unit 10 and display language specifying information is not transferred, the information indicative of the language use the last is retained in the selected-language-information storage area 52 of the flash ROM 22. Therefore, at the time of occurrence of an abnormality in the main-unit control unit 10, the user can be notified that an abnormality has occurred to the main unit with the display language corresponding to the retained selected language information. With this, it is possible to achieve a control configuration in which the main-unit control unit 10 and the operation control unit 20 are separated from each other, thereby increasing usability.

Figure 7:
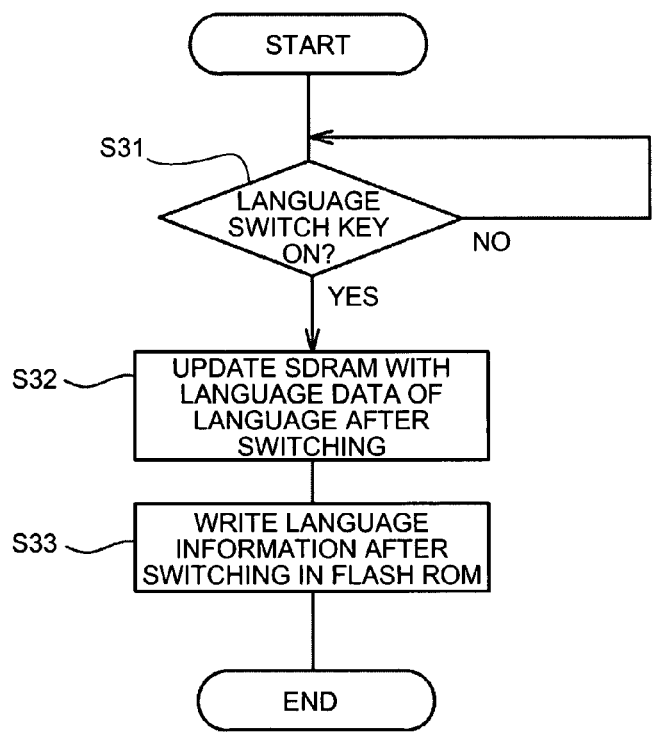
FIG. 7 is a flowchart of a process of writing the selected display language in the flash ROM of the operation control unit on a real time basis during a language switching process of the image forming apparatus according to the embodiment of the present invention.

FIG. 7 is a flowchart of a process of writing the selected language information in the selected-language-information storage area 52 of the flash ROM 22. When the language switch key 39 is pressed ("Yes" at step S31), display data on the SDRAM 25 is again rendered with the display language data after switching and, after the display is updated (step S32), the selected language information is written in the selected-language-information storage area 52 (step S33).

In this manner, with the configuration such that the selected language information retained in the selected-language-information storage area 52 of the flash ROM 22 is being retained again on a real-time basis, it is possible to more reliably select display language data suitable for the use environment of the user.

Figure 8:
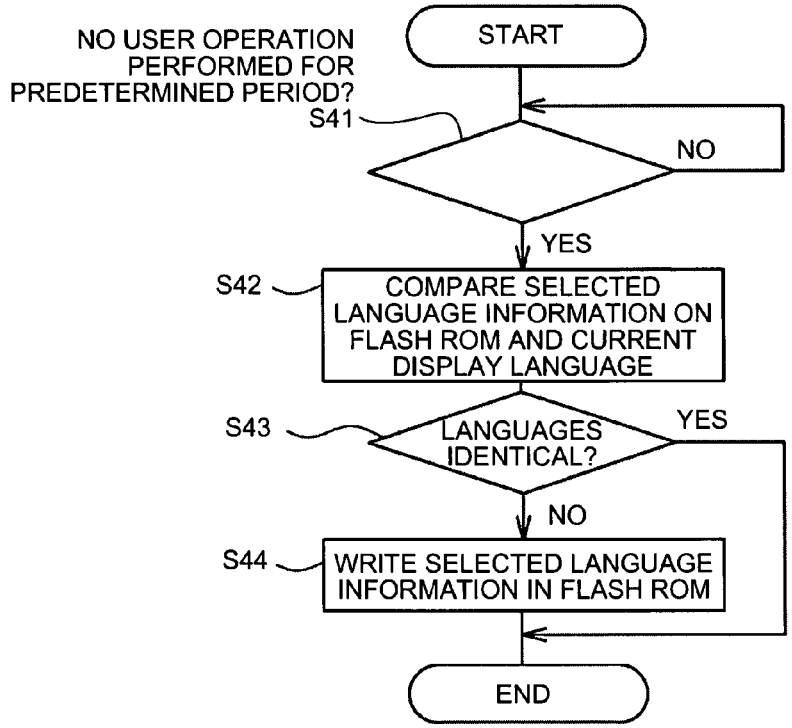
FIG. 8 is a flowchart of a process of writing the selected display language in the flash ROM of the operation control unit during a waiting period of the image forming apparatus according to the embodiment of the present invention.

FIG. 8 is a flowchart of a process of writing the selected language information in the selected-language-information storage area 52 of the flash ROM 22 of the operation control unit 20 during a waiting period in which the user does not use the image forming apparatus 1.

As shown in FIG. 8, if a state in which no hard key or touch panel is used continues for a predetermined period ("Yes" at step S41), the selected language information stored in the selected-language-information storage area 52 of the flash ROM 22 is compared with the current display language (step S42). If these languages are the same ("Yes" at step S43), any process is not particularly performed. If these languages are not the same ("No" at step S43), the selected language information indicative of the current display language data is written in the selected-language-information storage area 52 of the flash ROM 22 (step S44).

With this configuration, the selected language information on the flash ROM 22 can be updated without hindering the user's operation.

Figure 9:
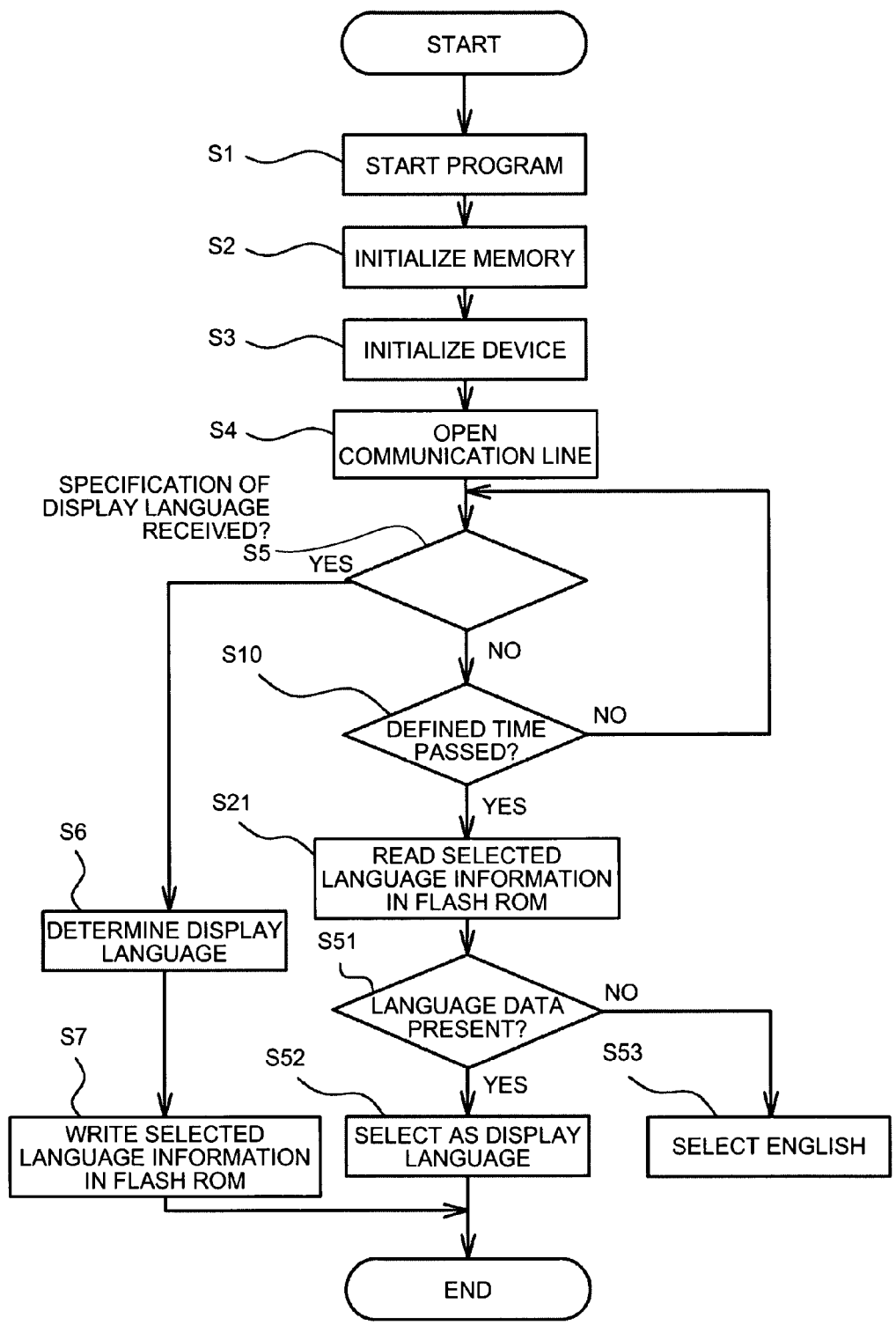
FIG. 9 is a flowchart of a language selecting process when specifying information of the display language cannot be received from the main-unit control unit within a defined time in the image forming apparatus according to the embodiment of the present invention, where language data to be selected is not present on the flash ROM.

FIG. 9 is a flowchart of a language selecting process when a specification of the display language cannot be received from the main-unit control unit 10 within a defined time, where language data to be selected is not present on the flash ROM. In FIG. 9, steps identical to those in FIG. 6 are provided with the reference numerals used in FIG. 6.

As shown in FIG. 9, after the selected language information written in the flash ROM 22 is read at the time of the previous activation (step S21), it is checked whether the display language data corresponding to the read selected language information is present in the first-language-data storage area 53 or the second-language-data storage area 54 of the flash ROM 22 (step S51). If the display language data is present ("Yes" at step S51), the display language data is selected as a display language (step S52). If it is not present ("No" at step S52), English regarded as an international standard language is selected as a display language (step S53).

With this configuration, even at the time of occurrence of an abnormality in the main-unit control unit 10 immediately after switching of the display language data, English is selected. Thus, with such a language with a high possibility of being able to be recognized by the user, the occurrence of the abnormality can be reported.

According to the present invention, in an electronic device including an operating unit capable of selectively causing a plurality of different languages to be displayed, the electronic device configured in a manner such that a display language specification is supplied from the device main unit to the operating unit at the time of activating the device, even if the specification is not supplied to the operating unit due to an abnormality of the device, language selection and display according to a use environment of the user can be made.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
an operating unit including
a storing unit that stores therein a plurality of different display language data that is switchable according to a use environment of a user;
a selecting unit that selects a display language data from the storing unit in response to display language specification information supplied from a main unit of the electronic device at a time of starting the electronic device;
a displaying unit that displays an operation screen with the display language data selected by the selecting unit, wherein
when the display language specification information is not supplied from the main unit, the selecting unit compares the display language data stored in the storing unit and the display language data set in a factory setting to check whether the display language data has been changed from the factory setting according to the use environment of the user and, when the display language data has been changed from the factory setting, the changed display language data is selected for display;
when the display language specification information is supplied from the main unit, the language data displayed is according to the specified information; and
when the display language specification information is not supplied from the main unit within a desired time, the electronic device determines that an abnormal operation has occurred in the main unit.

2. The electronic device according to claim 1, wherein the display language data include English data, and
the selecting unit selects the English data when there is no difference between the display language data stored in the storing unit and display language data set in the factory setting.

3. An electronic device comprising:
an operating unit including
a first storing unit that stores therein a plurality of different display language data that is switchable according to a use environment of a user;
a selecting unit that selects a display language data from the first storing unit in response to display language specification information supplied from a main unit of the electronic device at a time of starting the electronic device;
a displaying unit that displays an operation screen with the display language data selected by the selecting unit;
a second storing unit that stores therein selected language information indicating the display language data selected by the selecting unit, wherein
when the display language specification information is not supplied from the main unit, the selecting unit selects display language data corresponding to the selected language information from the first storing unit, wherein the display language data stored in the first storing unit and a display language data set in a factory setting are compared to check whether the display language data has been changed from the factory setting according to the use environment of the user, and when the display language data has been changed from the factory setting, the changed display language data is selected for display;
when the display language specification information is supplied from the main unit, the language data displayed is according to the specified information, and
when the display language specification information is not supplied from the main unit within a desired time, the electronic device determines that an abnormal operation has occurred in the main unit.

4. The electronic device according to claim 3, wherein the second storing unit stores therein the selected language information when the display language data is switched by the user.

5. The electronic device according to claim 3, wherein the second storing unit stores therein the selected language information while the electronic device is in a standby mode.

6. The electronic device according to claim 3, wherein when the display language data corresponding to the selected language information is not stored in the first storing unit, the selecting unit selects English data.

* * * * *